US011994601B2

(12) United States Patent
Valtersson

(10) Patent No.: US 11,994,601 B2
(45) Date of Patent: May 28, 2024

(54) METHOD FOR ESTIMATING THE ATTITUDE OF A VEHICLE

(71) Applicant: VOLVO TRUCK CORPORATION, Gothenburg (SE)

(72) Inventor: Edvin Valtersson, Sävedalen (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 236 days.

(21) Appl. No.: 17/295,626

(22) PCT Filed: Dec. 12, 2018

(86) PCT No.: PCT/EP2018/084585
§ 371 (c)(1),
(2) Date: May 20, 2021

(87) PCT Pub. No.: WO2020/119901
PCT Pub. Date: Jun. 18, 2020

(65) Prior Publication Data
US 2022/0003880 A1 Jan. 6, 2022

(51) Int. Cl.
*G01S 19/54* (2010.01)
(52) U.S. Cl.
CPC .................... *G01S 19/54* (2013.01)
(58) Field of Classification Search
CPC .......... G01S 19/54; G01S 19/55; G01S 19/47
See application file for complete search history.

(56) References Cited

U.S. PATENT DOCUMENTS 4,949,268 A * 8/1990 Nishikawa ............. G01C 21/28
701/472
5,257,195 A * 10/1993 Hirata ..................... G01S 19/49
701/472

(Continued)

FOREIGN PATENT DOCUMENTS

CN       101785039 A    7/2010
CN       103616665 A    3/2014

(Continued)

OTHER PUBLICATIONS

N. Dicu, G.-D. Andreescu and E. HoratiuGurban, "Automotive Dead-Reckoning Navigation System Based on Vehicle Speed and YAW Rate," 2018 IEEE 12th International Symposium on Applied Computational Intelligence and Informatics (SACI), Timisoara, Romania, May 17-19, 2018; on Xplore Aug. 23, 2018 . . . (Year: 2018).*

(Continued)

*Primary Examiner* — Bernarr E Gregory
(74) *Attorney, Agent, or Firm* — Venable LLP; Jeffri A. Kaminski

(57) ABSTRACT

A method for estimating the attitude of a vehicle by using a global navigation satellite system having a plurality of satellites, wherein the vehicle comprises at least a first antenna and a second antenna having a separation to each other, comprising the steps of: detecting an outage of said global navigation satellite system; starting a dead-reckoning algorithm in order to extrapolate a change in attitude during the outage of said global navigation satellite system obtaining a dead-reckoned attitude; detecting that said global navigation satellite system has recovered, in particular via the availability of carrier phase observables and calculating a new attitude using the recovered global navigation satellite (Continued)

system by incorporating the obtained dead-reckoned attitude as a starting condition.

12 Claims, 6 Drawing Sheets

(56) References Cited

U.S. PATENT DOCUMENTS

| | | | | | |
|---|---|---|---|---|---|
| 5,416,712 | A | * | 5/1995 | Geier | G01C 21/165 701/472 |
| 5,646,857 | A | * | 7/1997 | McBurney | G01C 21/20 701/489 |
| 5,890,090 | A | * | 3/1999 | Nelson, Jr. | G01S 19/50 701/472 |
| 6,087,965 | A | * | 7/2000 | Murphy | G01S 19/49 340/991 |
| 9,234,760 | B2 | * | 1/2016 | DeLuca | G01S 19/49 |
| 2002/0113719 | A1 | * | 8/2002 | Muller | G08G 5/0086 340/961 |
| 2008/0262728 | A1 | | 10/2008 | Lokshin et al. | |
| 2009/0058723 | A1 | * | 3/2009 | Mao | G01S 19/47 342/357.44 |
| 2009/0234582 | A1 | * | 9/2009 | Figueroa | G01S 19/49 701/472 |
| 2010/0103033 | A1 | * | 4/2010 | Roh | G01S 19/40 342/357.32 |
| 2013/0018581 | A1 | * | 1/2013 | Sidhu | G01S 19/26 701/469 |
| 2013/0116921 | A1 | * | 5/2013 | Kasargod | G01C 21/165 701/472 |

FOREIGN PATENT DOCUMENTS

| | | | |
|---|---|---|---|
| CN | 105607106 | A | 5/2016 |
| CN | 108957496 | A | 12/2018 |
| EP | 2541197 | A1 * | 1/2013 ........... G01C 21/165 |
| GB | 2352348 | A * | 1/2001 ............. G01C 21/12 |
| KR | 2011107656 | A * | 10/2011 ............. G01S 19/45 |

OTHER PUBLICATIONS

Chinese Office Action dated Sep. 16, 2023 in corresponding Chinese Patent Application No. 201880099649.X, 7 pages.

International Preliminary Report on Patentability dated Mar. 29, 2021 in corresponding PCT Application No. PCT/EP2018/084585, 9 pages.

Wang Chaochao et al: "Development of a Low-Cost Solution for GPS/Gyro Attitude Determination", NTM 2004—Proceedings of the 2004 National Technical Meeting of the Institute of Navigation, The Institute of Navigation, 8551 Rixlew Lane Suite 360 Manassas, VA 20109, USA, Jan. 28, 2004 (Jan. 28, 2004), pp. 267-276, XP056004796, figures 3,4,11 abstract pp. 269-270, section "Integartion Methodology".

Vasilyuk Nikolay et al: "Reading and Attitude Determination System with Low-cost IMU Embedded Inside One of Multiple Antennas", Plans 2018—Proceedings of IEEE/ION Plans 2018, The Institute of Navigation, 8551 Rixlew Lane Suite 360 Manassas, VA 20109, USA, Apr. 26, 2018 (Apr. 26, 2018), pp. 267-274, XP056014734, figure 2 abstract p. 267, section "Introduction", first paragraph p. 272, section B, first paragraph p. 274, right-hand column, first four lines.

Yuan G et al: "INS Aided GPS Integer Ambiguity Resolution and Real Time Vehicle Attitude Determination", PNT 2013—Proceedings of the ION 2013 Pacific PNT Meeting, The Institute of Navigation, 8551 Rixlew Lane Suite 360 Manassas, VA 20109, USA, Apr. 25, 2013 (Apr. 25, 2013), pp. 1040-1048, XP056008267.

International Search Report and Written Opinion dated Sep. 13, 2019 in corresponding International PCT Application No. PCT/EP2018/084585, 8 pages.

* cited by examiner

METHOD FOR ESTIMATING THE ATTITUDE OF A VEHICLE

CROSS-REFERENCE TO RELATED APPLICATIONS

This application is a U.S. National Stage application of PCT/EP2018/084585, filed Dec. 12, 2018, and published on Jun. 18, 2020, as WO 2020/119901 A1, all of which is hereby incorporated by reference in its entirety.

TECHNICAL FIELD

The invention relates to a method for estimating the attitude of a vehicle by using a global navigation satellite system.

The invention can be applied in heavy-duty vehicles, such as trucks, buses and construction equipment. Although the invention will be described with respect to a truck, the invention is not restricted to this particular vehicle, but may also be used in other vehicles such as motorcars.

BACKGROUND

Contemporary vehicle positioning solutions are using a global navigation satellite system (GNSS) in order to obtain heading information about said vehicle. However, the heading information is usually only provided when said vehicle is moving.

Moreover, global navigation satellite system information is usually combined with information of at least one inertial measurement unit (IMU) or other vehicle data to increase the availability of said heading information. This, however, is only possible when said vehicle has first been moving. Furthermore, this also suffers from sensor calibration issues where inaccurately calibrated sensors will cause said information to drift, i.e. become inaccurate.

Moreover, there is also an issue with the global navigation satellite system providing said heading information of the antenna (which is not the same as the attitude, e.g. the direction, of said vehicle).

One option to solve the above mentioned problems is to combine the global navigation satellite system heading information, inertial measurement unit data, vehicle speed and wheel base to calculate the attitude of said vehicle instead of the antenna heading. However, this is challenging since it is hard to estimate the effective wheel base of a vehicle, in particular of a truck, with dynamic geometries and properties, such as liftable rear axles and different load conditions etc.

SUMMARY

An object of the invention is to provide a method for estimating the attitude of a vehicle, which provides an accurate vehicle attitude.

The object is achieved by a method according to claim 1.

According to a first aspect of the invention, the object is achieved by a method for estimating the attitude of a vehicle by using a global navigation satellite system having a plurality of satellites, wherein the vehicle comprises at least a first antenna and a second antenna having a separation to each other, comprising the steps of: detecting an outage of said global navigation satellite system; starting a dead-reckoning algorithm in order to extrapolate a change in attitude during the outage of said global navigation satellite system obtaining a dead-reckoned attitude; detecting that said global navigation satellite system has recovered, in particular via the availability of carrier-phase-observables; and calculating a new attitude using the recovered global navigation satellite system by incorporating the obtained dead-reckoned attitude as a starting condition.

Thus, a method is proposed, wherein a vehicle having two antennas is used to estimate the attitude of said vehicle after an outage of the global navigation satellite system.

Said outages of said global navigation satellite system may occur due to numerous reasons, for example due to bad weather conditions causing signal losses or said vehicle passing tunnels causing the unavailability of said satellite signals.

In order to detect said outage global navigation satellite system, information about said satellite signals may used, e.g. a time limit having a predetermined time, for example about 5 seconds. Thus, an outage of said global navigation satellite system is assumed if said vehicle does not receive any viable satellite signals for at least 5 seconds. For this, a global navigation satellite system receiver may used, e.g. a GNSS receiver of said vehicle. The global navigation satellite system receiver may functionally arranged for detecting a loss-of-lock on the carrier phase tracking. Thus, said receiver is at least arranged for carrier phase tracking. Preferably, said viable satellite signal are carrier phase observables and therefore, the availability of said carrier phase observables if used to detect whether there is an outage of said global navigation satellite system or not.

After detecting said outage of said global navigation satellite system, a dead-reckoning algorithm is started, in particular to obtain a dead-reckoned attitude. For this, said dead-reckoning algorithm extrapolates the change in attitude of said vehicle, preferably based on the last known precise attitude of said vehicle, which was, for example, obtained before said outage of said global navigations satellite system and/or speed and direction information of said vehicle. Said speed and direction information may obtained by vehicle sensors, such as speedometer or accelerometer.

After a while, said global navigation satellite system may recover, for example when said vehicle passed said tunnel. To detect that said global navigation satellite system has recovered, satellite signals may used, preferably said carrier phase observables.

After detecting that said global navigation satellite system has recovered, in particular via the availability of said carrier phase observables, a new attitude is calculated, preferably by incorporating said dead-reckoned attitude as a starting condition. Thus, the last know and precise dead-reckoned attitude is used as a starting condition for estimating said attitude of said vehicle. In particular, said dead-reckoned attitude is used as a starting condition when searching for a new solution candidate after the outage of said global navigation satellite system. Said new attitude may also be used as a starting condition for a method using a lambda algorithm and/or a Kalman filter as described below.

An advantage of the provided method is the relatively short convergence time compared to other known methods. In particular, and due to said dead-reckoning attitude, said new attitude may be found much faster.

In a preferred embodiment, said outage of said global navigation satellite system is detected via carrier phase measurements, in particular via the availability of carrier phase observables.

Thus, said method comprises at least one step, wherein carrier phase measurements are carried out. Preferably, to detect whether carrier phase observables are available or not.

In a preferred embodiment, said dead-reckoned attitude is only provided by internal aiding.

Thus, only internal vehicle sensor data is used to obtain said dead-reckoned attitude. Preferably, said internal vehicle sensor data is provided by vehicle sensors providing information about the speed and/or the direction of said vehicle. For example, a speedometer and/or a gyroscope of said vehicle. Preferably, at least one speedometer is used.

In a preferred embodiment, said outage of said global navigation satellite system is less than 10 minutes, preferably less than 5 minutes, more preferably less than 2 minutes. In a more preferred embodiment, said outage of said global navigation satellite system lasts for at least 10 seconds.

Thus, said method is addressed to short outages of said global navigation satellite system, for example, when passing a tunnel or moving between skyscrapers. To detect such situations additional information beside said availability of said carrier phase observables may used, e.g. map data or other sensor data. However, said method may also used for long outages of said global navigation satellite system.

In a preferred embodiment, the change in attitude is based on said dead-reckoning algorithm and a previous known attitude.

Thus, the change in attitude during said outage of said global navigation satellite system is calculated based on at least said dead-reckoning algorithm and a previous know attitude. Preferably, the previous known attitude is a precise one, which was calculated before said outage of said global navigation satellite system, e.g. the last one used before said outage of said global navigation satellite system.

In a more preferred embodiment, said known attitude was validated before said outage of said global navigation satellite system.

Thus, the known attitude is an attitude of said vehicle which was calculated before said outage of said global navigation satellite system, e.g. one which was used to navigate said vehicle before said outage of said global navigation satellite system.

In a preferred embodiment, said method further comprises the step of: using said new attitude as a starting condition in a lambda-method, in particular while the global navigation satellite system is active or after said outage.

Thus, said method is preferably used in a method to estimate the attitude of a vehicle as described below, in particular a method using a lambda-method to estimate said attitude.

In a more preferred embodiment, said lambda-method comprises the usage of at least one Kalman filter and said new attitude is used as a starting condition for said Kalman filter.

In a more preferred embodiment, said global navigation satellite system further comprises at least one base station and said relative position of said vehicle is a relative position to said base station.

According to a second aspect of the invention, the object is achieved by a method for estimating the attitude of a vehicle by using a global navigation satellite system having a plurality of satellites, wherein the vehicle comprises at least a first antenna and a second antenna having the same height with respect to said vehicle and a separation to each other, comprising the steps of: performing a lambda-method in order to obtain at least one relative position of said vehicle, wherein the relative position is validated in order to reduce a ratio test threshold and/or performing a lambda-method and using a Kalman filter, wherein a starting condition for the Kalman filter is used based on at least one previous information about the attitude.

Thus, a method is proposed, wherein a vehicle having two antennas, and preferably two receivers, is used to estimate the attitude of said vehicle, in particular by using a lambda-method.

In particular, a real time kinematic lambda algorithm is run between said two receivers on said vehicle to estimate said relative position of said vehicle.

In particular, a method is provided wherein double difference is used. By placing two global navigation satellite system antennas, and in particular two global navigation satellite system receivers, on said vehicle providing raw satellite observables, it is possible to apply real time kinematic (RTK) algorithms to find the relative position of the antennas enabling to calculate the attitude of said vehicle. Moreover, as long as the real time kinematic integer ambiguity fix for said antennas is known, it is possible to calculate the fix, even when the truck is stationary.

In one embodiment, a lambda-method is performed in order to obtain at least one relative position of said vehicle, wherein the relative position is validated in order to reduce a ratio test threshold. Thus, the proposed method differs from known lambda-method in a knowledge about the actual relative positions to said global navigation satellite system station. In particular, the knowledge of said antenna, e.g. said separation and/or said height, is used to improve the search algorithm.

For example, if the exact separation of said antennas is known, this can be used to validate a solution in order to obtain the attitude of said vehicle. Moreover, if said antennas have the same height, this can also be used to validate a possible candidate. In particular, any possible solution not matching the know separation and/or height can immediately be discarded. Thus, the proposed method reduces the ratio test threshold which will reduce the convergence time and therefore, the proposed method is faster or more accurate, in particular than known lambda-methods.

Additionally or alternatively, a Kalman filter is used, wherein a starting condition for the Kalman filter is used based on at least one previous information about the attitude.

For example, if previous information about the heading is known, this can be used to serve as a starting condition for said Kalman filter. Preferably, said previous information about the attitude, is one of a method as described below, in particular the described new attitude.

In a preferred embodiment, said relative position is validated by using at least one of: said separation and said height.

Thus, at least said separation or said height is used as an additional validation criteria reducing the ratio test threshold. Preferably, said separation and said height are used.

In a more preferred embodiment, said starting condition is an attitude obtained by a dead-reckoning algorithm.

Preferably, said deck-reckoning algorithm was performed during an outage of said global navigation satellite system. Preferably, said outage of said global navigation satellite system is less than 10 minutes, more preferably less than 5 minutes, in particular less than 2 minutes. In a more preferred embodiment, said outage of said global navigation satellite system lasts for at least 10 seconds.

Thus, the proposed method uses an attitude of a below described method, which calculates a new attitude by using a dead-reckoning algorithm, in particular as described below.

According to a third aspect of the invention, the object is achieved by a computer program comprising program code means for performing the steps of said method described above or below when said program is run on a computer.

According to a fourth aspect of the invention, the object is achieved by a computer readable medium carrying a computer program comprising program code means for performing the steps of said method described above or below when said program product is run on a computer.

According to a fifth aspect of the invention, the object is achieved by an estimation unit for estimating the attitude of a vehicle, wherein the estimation unit is configured to perform the steps of said method described above or below.

According to a sixth aspect of the invention, the object is achieved by a movement estimation device for a vehicle, wherein the movement estimation device comprises optionally a computer and at least one of: an above or below described computer program, an above or below described computer readable medium, an above or below described estimation unit.

According to a seventh aspect of the invention, the object is achieved by a vehicle comprising an above or below described movement estimation device.

In one embodiment, said vehicle further comprises at least a first antenna and a second antenna for communicating with a global navigation satellite system, in particular to provide raw satellite observables.

In a preferred embodiment, said vehicle also comprises at least a first receiver and a second corresponding receiver for communicating with the global navigation satellite system.

In a more preferred embodiment, said vehicle also comprises at least one movement speed estimation unit having at least one movement speed and/or movement direction sensor and/or two global navigation satellite system receivers for tracking carrier phases. Preferably, said vehicle also comprises at least one yaw rate estimation unit

BRIEF DESCRIPTION OF THE DRAWINGS

With reference to the appended drawings, below follows a more detailed description of embodiments of the invention cited as examples.

In the drawings.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF EXAMPLE EMBODIMENTS OF THE INVENTION

Figure 1:
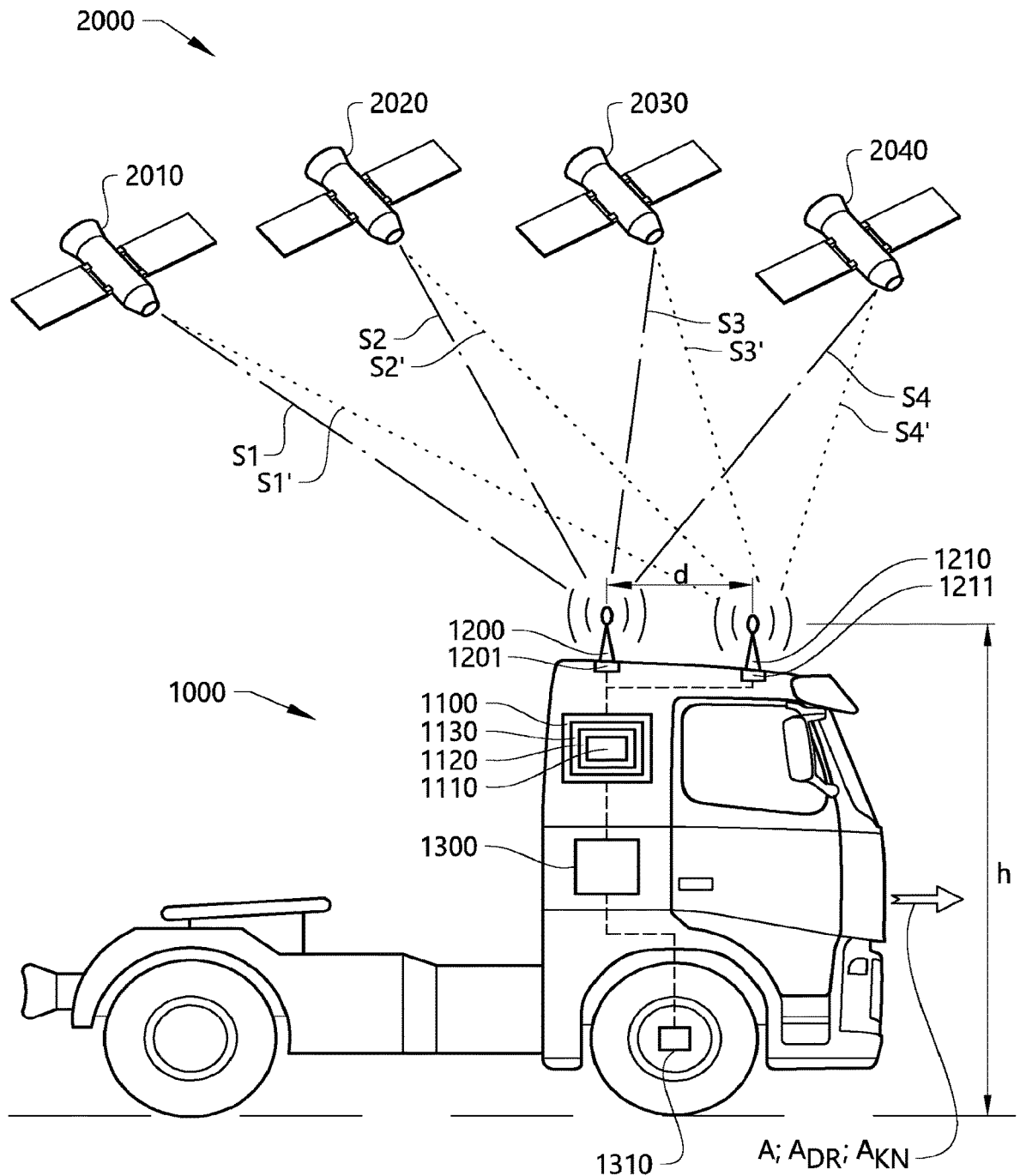
FIG. 1 shows a vehicle having two antennas interacting with a global navigation satellite system in order to estimate the attitude of said vehicle.

FIG. 1 shows a vehicle 1000, in particular a truck, having an attitude A and interacting with a global navigation satellite system 2000 via a first and a second antenna 1200, 1210 in order to obtain said attitude A of said vehicle 1000.

Hence, said vehicle comprises at least a first antenna 1200 and a second antenna 1210 having a separation d to each other and preferably the height h for communicating with the global navigation satellite system 2000. In a preferred embodiment, said vehicle 1000 also comprises two receivers for communicating with the global navigation satellite system 2000.

Moreover, said vehicle 1000 also comprises a movement estimation device 1100 and a movement speed estimation unit 1300.

Said movement estimation device 1100 comprises a computer program 1110, a computer readable medium 1120 and an estimation unit 1130.

Said movement estimation device 1100 is further adapted for performing said above or below described method 100 for estimating the attitude A of said vehicle 1000.

In particular, said movement estimation device 1100 is connected to said antennas 1200, 1210 and said movement speed estimation unit 1300.

Preferably, said antennas 1200, 1210 are installed at the roof of said vehicle 1000 and the movement speed estimation unit 1300 comprises a movement speed and/or movement direction sensor 1310, which is arranged for estimating the speed and/or direction of said vehicle 1000. Preferably, said vehicle 1000 also comprises a first receiver 1201 and a second receiver 1202, in particular wherein said first receiver 1201 corresponds to said first antenna 1200 and said second receiver 1211 corresponds to said second antenna 1210.

Said global navigation satellite system 2000 comprises at least a plurality of satellites 2010, 2020, 2030, 2040 and preferably a base station interacting with said antennas 1200, 1210 of said vehicle 1000, in particular via the signals S1, S1', S2, S2', S3, S3', S4, S4'.

Thus, said vehicle 1000 is adapted for double difference via said antennas 1200, 1210.

Figure 3:
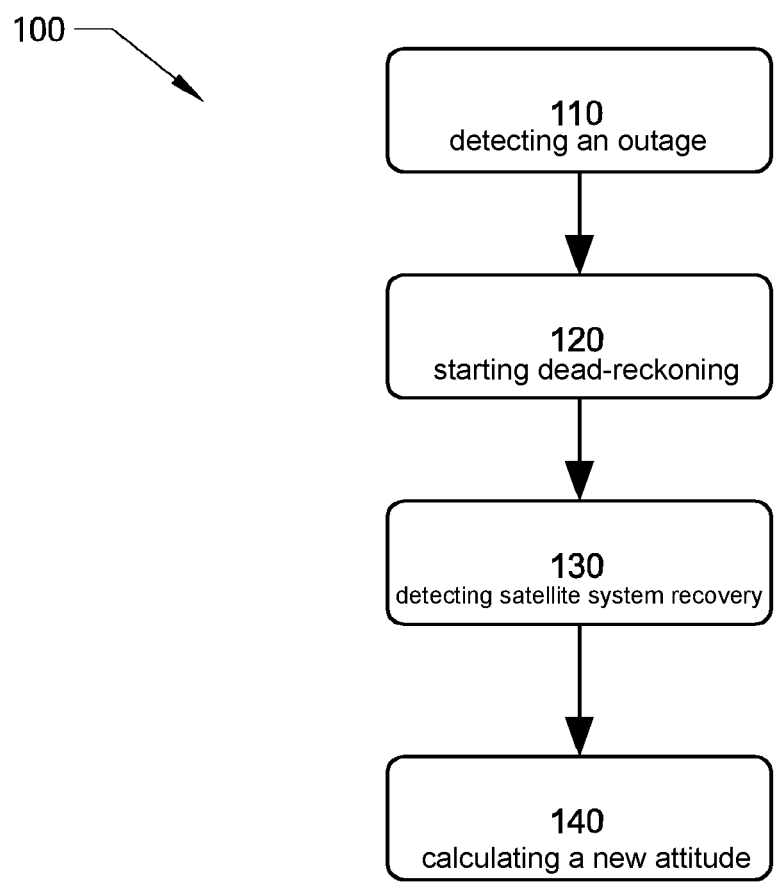
FIG. 3 shows an embodiment of a method according to the invention.
Figure 4:
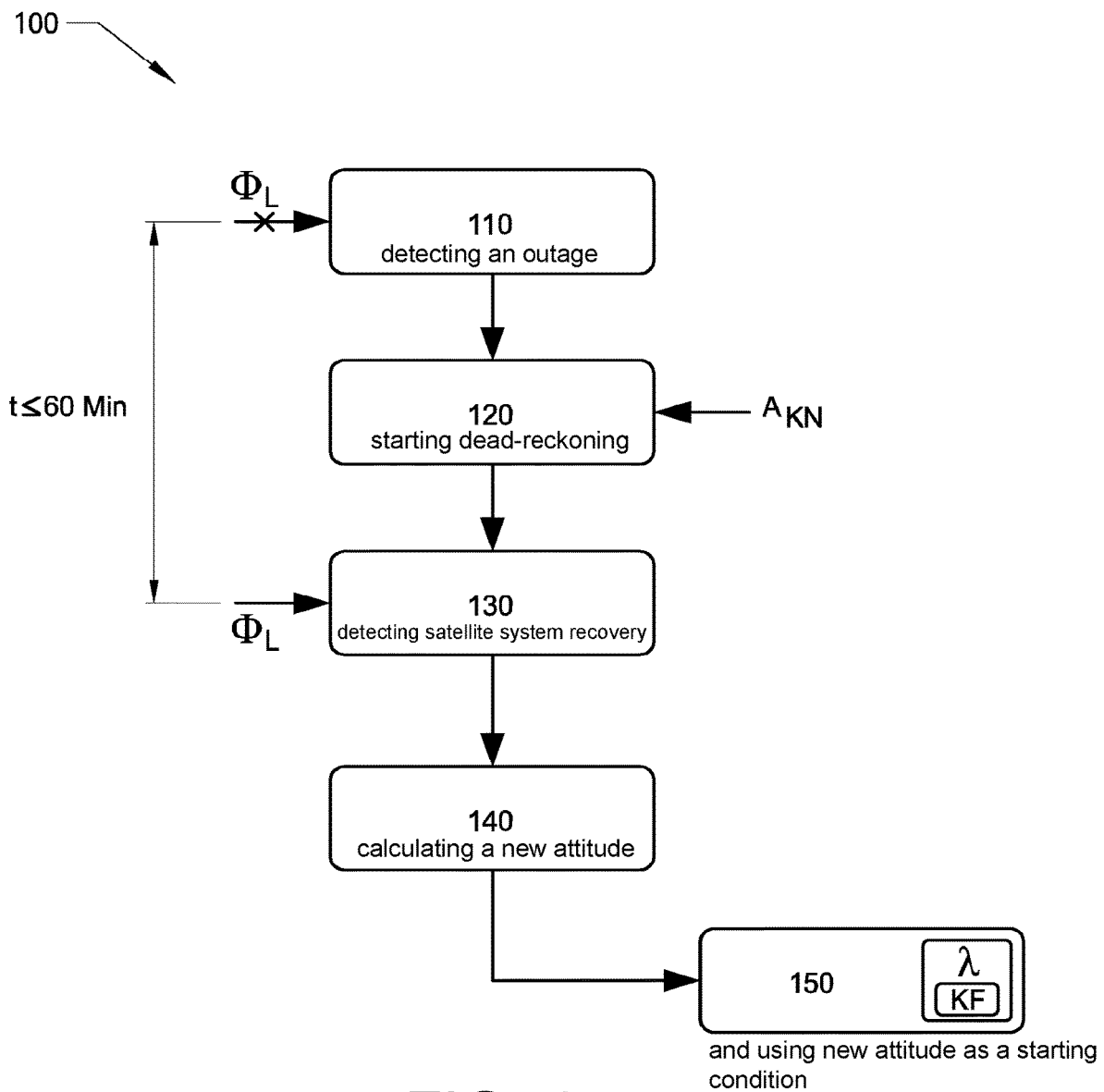
FIG. 4 shows a preferred embodiment of a method according to the invention.
Figure 5:
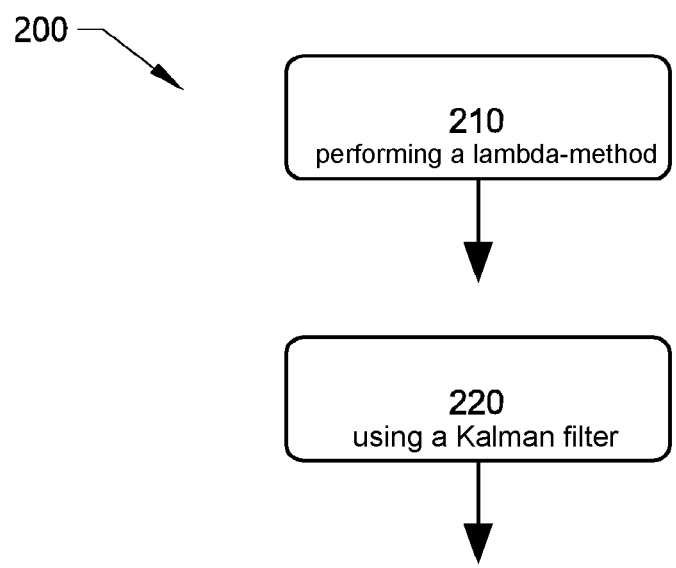
FIG. 5 shows an embodiment of a method according to another aspect of the invention.
Figure 6:
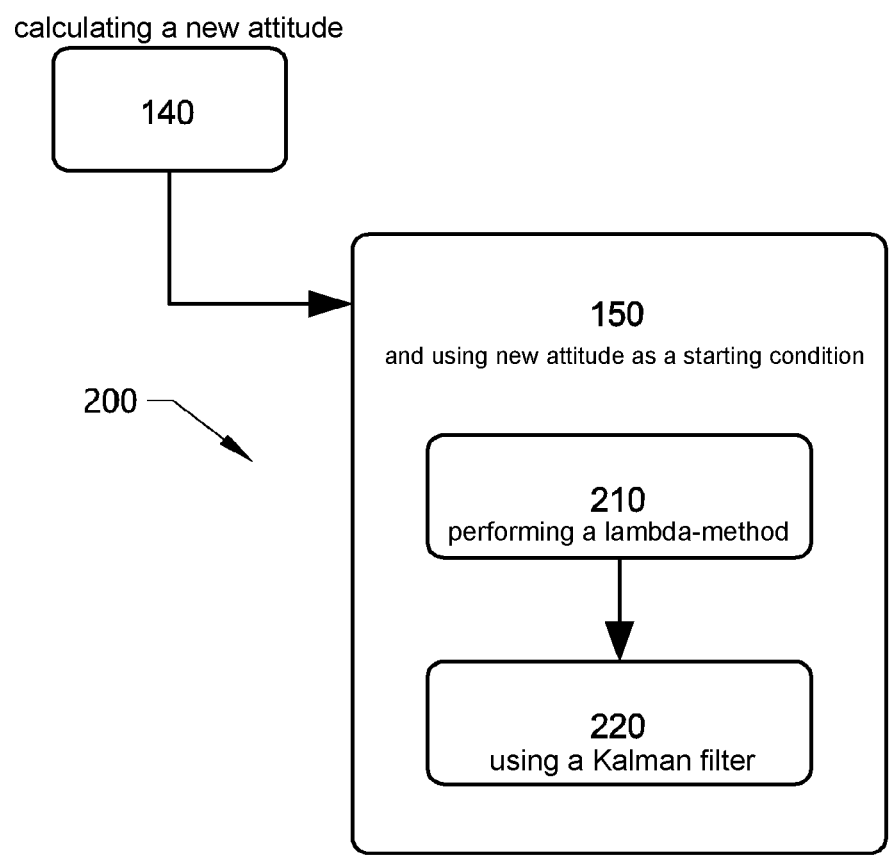
FIG. 6 shows a preferred embodiment of a method according to another aspect the invention.

One way of estimating said attitude A of said vehicle 1000 is proposed in FIG. 3 and/or FIG. 4 as well as in FIG. 5 and/or FIG. 6.

Figure 2:
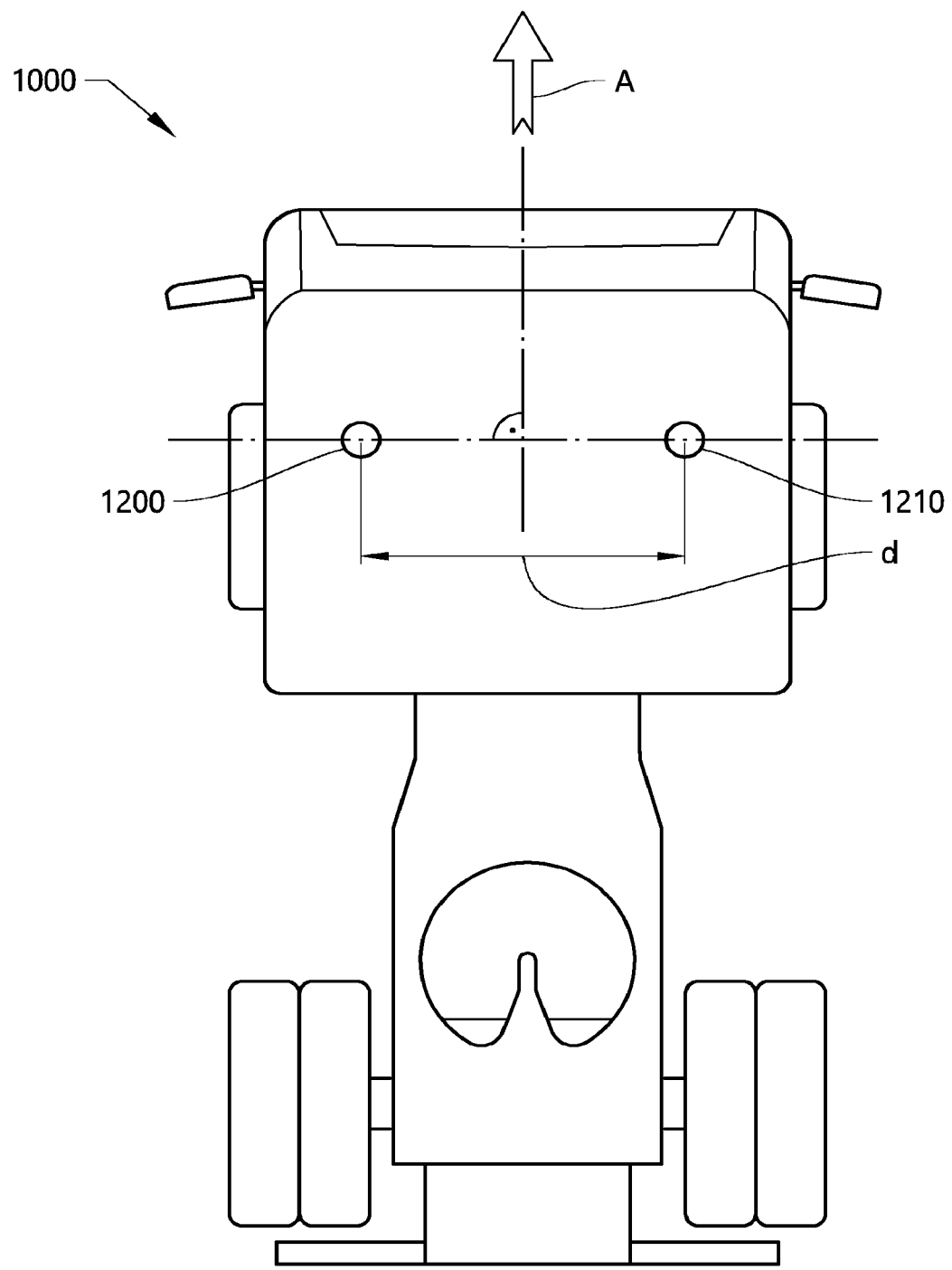
FIG. 2 shows a vehicle having two antennas in a topview.

FIG. 2 shows a vehicle 1000 having two antennas 1200, 1210 in a topview, in particular the topview of said vehicle 1000 in FIG. 1.

Said vehicle 1000 has an attitude A and said antennas 1200, 1210 are mounted at the roof at said vehicle 1000, having a separation d to each other. Preferably, said antennas 1200, 1210 are installed at said roof such that said separation d is square to said attitude A.

FIG. 3 shows an embodiment of a method 100 for estimating the attitude of a vehicle, preferably a truck as shown in FIG. 1 and/or FIG. 2.

The method 100 comprises the steps of: detecting an outage 110 of the global navigation satellite system; starting a dead-reckoning algorithm 120; detecting that said global navigation satellite system has recovered 130 and calculating a new attitude 140.

In a first step 110, it is detected that said global satellite navigation satellite system has an outage, e.g. said global navigation satellite system does not provide proper carrier phase observables. Preferably, said outage is detected by an global navigation satellite system receiver which is part of said vehicle.

In a second step 120, when the outage of said global navigation satellite system is present, a dead-reckoning algorithm is started. The dead-reckoning algorithm is used to extrapolate the change in attitude (of said vehicle) during said outage of said global navigation satellite system, in particular to obtain a dead-reckoned attitude. Preferably, said dead-reckoned attitude is used as a substitute for the regular attitude, which may not be calculated due to said outage of said global navigation satellite system.

In a third step 130, it is detected that said global navigation satellite system has recovered. Preferably, by using an availability of carrier phase observables. Thus, the global navigation satellite system is defined as recovered when normal carrier phase observables, as before said outage of said global navigation satellite system, are available.

In a fourth step 140, the new attitude is calculated, in particular by using the recovered global navigation satellite system, e.g. the carrier phase observables, and said dead-reckoned attitude as a starting condition. Thus, said new attitude is based said dead-reckoned attitude and information of said recovered global navigation satellite system. By using said dead-reckoning attitude for estimating the attitude, faster convergence in search is enabled.

FIG. 4 shows a preferred embodiment of a method 100 for estimating the attitude of a vehicle, preferably a truck as shown in FIG. 1 and/or FIG. 2.

The method 100 comprises the steps of: detecting an outage 110 of the global navigation satellite system; starting a dead-reckoning algorithm 120; detecting that said global navigation satellite system has recovered 130, calculating a new attitude 140 and using said new attitude as a starting condition 150.

In a first step 110, it is detected that said global satellite navigation satellite system has an outage, e.g. said global navigation satellite system does not provide proper carrier phase observables. Thus, carrier phase observables $\phi_L$, in particular raw carrier phase observables, are used to determine whether the global navigation satellite system is available or not, e.g. by a global navigation satellite system receiver of said vehicle.

In a second step 120, when no suitable carrier phase observables are available, an outage of said global navigation satellite system is assumed and therefore, a dead-reckoning algorithm is started. The dead-reckoning algorithm is used to extrapolate the change in attitude (of said vehicle) during said outage of said global navigation satellite system, in particular to obtain a dead-reckoned attitude $A_{DR}$. Said change in attitude is based on said dead-reckoning algorithm and a previous known attitude $A_{KN}$. Said previous known attitude $A_{KN}$ is, for example, the last known and used attitude while said global navigation satellite system was available. Thus, said dead-reckoned attitude is used as a substitute for the regular attitude, which may not be calculated due to said outage of said global navigation satellite system.

In a third step 130, it is detected that said global navigation satellite system has recovered. Preferably, by using an availability of carrier phase observables $\phi_L$. Thus, the global navigation satellite system is defined as recovered when normal carrier phase observables, as before said outage of said global navigation satellite system, are available. In preferred embodiment, said outage of said global navigation satellite system is less than 5 minutes, preferably less than 2 minutes. Thus, the proposed method is addressed to short outages of said global navigation satellite system, e.g. while said vehicle is passing a tunnel.

In a fourth step 140, the new attitude is calculated, in particular by using the recovered global navigation satellite system, e.g. the carrier phase observables, and said dead-reckoned attitude as a starting condition. Thus, said new attitude is based said dead-reckoned attitude and information of said recovered global navigation satellite system. By using said dead-reckoning attitude for estimating the attitude, faster convergence in search is enabled In a fifth step 150, said new attitude is used as a starting condition in a lambda-method, which preferably uses a Kalman filter to estimate the attitude of said vehicle. Said lambda-method may a method as shown in FIG. 5 and/or FIG. 6.

FIG. 5 shows an embodiment of a method 200 for estimating the attitude of a vehicle, preferably a truck as shown in FIG. 1 and/or FIG. 2, more preferably by using said new attitude of a method as shown in FIG. 3 and/or FIG. 4 as a starting condition.

The method 200 comprises the steps of: performing a lambda-method 210 and/or performing a lambda-method and using a Kalman filter 220.

Thus, said lambda-method 210 is used to obtain at least one relative position of said vehicle 1000. Said vehicle may a vehicle as shown in FIG. 1 and/or FIG. 2. In particular, in said lambda-method 210 said relative position is validated in order to reduce a ratio test threshold. For this, said relative position is validated by using at least one of: the separation and the height of at least two antenna and receivers.

Alternatively or additionally, a Kalman filter 220 may used. If so, a starting condition for the Kalman filter is used based on at least one previous information about the attitude. Preferably, such previous information about the attitude, is said new attitude as described for method shown in FIG. 3 and FIG. 4. Thus, a previous information about the heading may used as a starting criteria for said Kalman filter. Advantageously, said additional validation criteria reduces the ratio test threshold which will reduce the convergence time and therefore, said proposed method will be faster than known lambda-methods. In addition, said reduction of said convergence time also leads to less hardware requirements having the same performance as known lambda-methods.

FIG. 6 shows a preferred embodiment of a method 200 as shown in FIG. 5, preferably for a truck as shown in FIG. 1 and/or FIG. 2, in particular by using said new attitude of a method as shown in FIG. 3 and/or FIG. 4 as a starting condition.

The method 200 comprises the steps of: providing a new attitude 140, in particular as shown in FIG. 3 and/or FIG. 4, as a starting condition and using said new attitude as a starting condition 150.

The step of using said new attitude as a starting condition 150 also comprises both steps as shown in FIG. 5.

Thus, the proposed method comprises the steps of: providing a new attitude 140, performing a lambda-method as described herein 150 by using a Kalman filter as described herein.

REFERENCE NUMERALS 100 method for estimating the attitude of a vehicle
110 step of: detecting an outage
120 step of: starting a dead-reckoning algorithm
130 step of: detecting recovery
140 step of: calculating a new attitude
150 step of: using said new attitude as a starting condition
200 method for estimating the attitude of a vehicle
210 step of: performing a lambda-method
220 step of: using a Kalman filter
1000 vehicle
1100 movement estimation device
1110 computer program
1120 computer readable medium 1130 estimation unit
1200 first antenna
1201 first receiver
1210 second antenna
1211 second receiver
1300 movement speed estimation unit
1310 movement speed sensor
2000 global navigation satellite system
2010, 2020, 2030 2040 plurality of satellites
A attitude of said vehicle
$A_{DR}$ dead-reckoned attitude of said vehicle
$A_{KN}$ known attitude of said vehicle
d distance between antennas
h height of antennas
KF Kalman filter
S1, S2, S3, S4 first signals of said satellites
S1', S2', S3', S4' second signals of said satellites
$\phi_L$ observable
λ lambda-method

The invention claimed is:

1. A method for estimating an attitude of a vehicle by using a global navigation satellite system having a plurality of satellites, wherein the vehicle comprises at least a first antenna and a second antenna having a separation to each other, comprising:
   detecting an outage of said global navigation satellite system;
   starting a dead-reckoning procedure to extrapolate a change in attitude during the outage of said global navigation satellite system obtaining a dead-reckoned attitude;
   detecting that said global navigation satellite system has recovered via the availability of carrier phase observables;
   calculating the attitude using the recovered global navigation satellite system by incorporating the obtained dead-reckoned attitude as a starting condition.

2. A method according to claim 1, wherein the outage of said global navigation satellite system is detected via carrier-phase-measurements.

3. A method according to claim 1, wherein the dead-reckoned attitude is only provided by internal aiding.

4. A method according to claim 1, wherein the outage of said global navigation satellite system is less than 10 minutes.

5. A method according to claim 1, wherein the change in attitude is based on said dead-reckoning algorithm and a previous known attitude.

6. A method according to claim 5, wherein the known attitude was validated before said outage of the global navigation satellite system.

7. A method according to claim 1, further comprising the step of:
   using said new attitude as a starting condition in a lambda-method.

8. A method according to claim 7, wherein said lambda-method comprises the usage of at least one Kalman filter and said new attitude is used as a starting condition for said at least one Kalman filter.

9. A non-transitory computer readable medium carrying a computer program comprising program code for performing the steps of claim 1 when said program code is run on a computer.

10. An estimation unit for estimating the movement of a vehicle, the estimation unit configured to perform the steps of the method according to claim 1.

11. A vehicle according to claim 1, further comprising at least a first antenna and a second antenna for communicating with a global navigation satellite system, in particular to provide raw satellite observables.

12. A vehicle according to claim 1, further comprising at least:
   one movement speed estimation unit having at least one movement speed and/or movement direction sensor and/or
   two global navigation satellite system receivers for tracking carrier phases.

* * * * *